United States Patent
Suciu et al.

(10) Patent No.: US 9,663,239 B2
(45) Date of Patent: May 30, 2017

(54) CLOCKED THRUST REVERSERS

(71) Applicant: United Technologies Corporation, Hartford, CT (US)

(72) Inventors: Gabriel L. Suciu, Glastonbury, CT (US); Jesse M. Chandler, South Windsor, CT (US)

(73) Assignee: United Technologies Corporation, Farmington, CT (US)

( * ) Notice: Subject to any disclaimer, the term of this patent is extended or adjusted under 35 U.S.C. 154(b) by 30 days.

(21) Appl. No.: 14/440,718

(22) PCT Filed: Mar. 14, 2013

(86) PCT No.: PCT/US2013/031173
§ 371 (c)(1),
(2) Date: May 5, 2015

(87) PCT Pub. No.: WO2014/074144
PCT Pub. Date: May 15, 2014

(65) Prior Publication Data
US 2015/0298814 A1 Oct. 22, 2015

Related U.S. Application Data

(60) Provisional application No. 61/725,106, filed on Nov. 12, 2012.

(51) Int. Cl.
*F02K 1/54* (2006.01)
*B64D 33/04* (2006.01)
(Continued)

(52) U.S. Cl.
CPC ................ *B64D 33/04* (2013.01); *B64C 5/02* (2013.01); *B64C 5/06* (2013.01); *B64D 27/20* (2013.01); *F02K 1/54* (2013.01); *F02K 1/62* (2013.01)

(58) Field of Classification Search
CPC .... B64C 5/06; B64C 5/02; B64C 5/01; B64C 1/00; B64D 47/00; B64D 27/20;
(Continued)

(56) References Cited

U.S. PATENT DOCUMENTS 3,936,017 A * 2/1976 Blythe .................. B64C 25/423
181/213
3,997,134 A 12/1976 Drakeley
(Continued)

OTHER PUBLICATIONS

Asbury et al,"Static Performance of a Wing-Mounted Thrust Reverser Concept", 1998.*
(Continued)

*Primary Examiner* — Brian M O'Hara
*Assistant Examiner* — Assres H Woldemaryam
(74) *Attorney, Agent, or Firm* — Carlson, Gaskey & Olds, P.C.

(57) ABSTRACT

An aircraft includes a fuselage including a propulsion system supported within an aft portion. A thrust reverser is mounted proximate to the propulsion system for directing thrust in a direction to slow the aircraft. The thrust reverser directs thrust at an angle relative to a vertical plane to reduce interference on control surfaces and reduce generation of underbody lift.

12 Claims, 4 Drawing Sheets

(51) Int. Cl.
*B64C 5/02* (2006.01)
*B64C 5/06* (2006.01)
*B64D 27/20* (2006.01)
*F02K 1/62* (2006.01)

(58) Field of Classification Search
CPC ... B64D 41/00; B64D 33/04; F02K 1/62; F02K 3/02; F02K 1/544
See application file for complete search history.

(56) References Cited

U.S. PATENT DOCUMENTS

| | | | |
|---|---|---|---|
| 4,193,569 A | 3/1980 | Nichols | |
| 5,230,213 A * | 7/1993 | Lawson | F02K 1/563 244/110 B |
| 5,396,762 A | 3/1995 | Standish | |
| 5,778,659 A | 7/1998 | Duesler et al. | |
| 6,089,504 A * | 7/2000 | Williams | B64C 1/00 244/15 |
| 6,543,718 B2 | 4/2003 | Provost | |
| 6,629,670 B1 | 10/2003 | Shah | |
| 6,688,099 B2 | 2/2004 | Lair | |
| 6,792,746 B2 | 9/2004 | Saito et al. | |
| 7,540,450 B2 | 6/2009 | Brand et al. | |
| 8,015,796 B2 | 9/2011 | Babu et al. | |
| 8,015,797 B2 * | 9/2011 | Lair | F02K 1/60 244/110 B |
| 8,127,532 B2 | 3/2012 | Howe | |
| 8,523,101 B2 * | 9/2013 | Cazals | B64C 5/12 244/12.5 |
| 8,651,414 B2 * | 2/2014 | Cazals | B64C 1/068 244/13 |
| D735,633 S * | 8/2015 | Viala | D12/319 |
| 2003/0168552 A1 * | 9/2003 | Brown | B64C 11/46 244/55 |
| 2009/0084889 A1 * | 4/2009 | Cazals | B64C 5/02 244/12.1 |
| 2009/0313969 A1 * | 12/2009 | Lair | F02K 1/60 60/226.2 |
| 2010/0038472 A1 | 2/2010 | Cazals et al. | |

OTHER PUBLICATIONS

International Search Report and Written Opinion for International Application No. PCT/US2013/031173 mailed on Jan. 13, 2014.
International Preliminary Report on Patentability for International Application No. PCT/US2013/031173 mailed May 21, 2015.

* cited by examiner

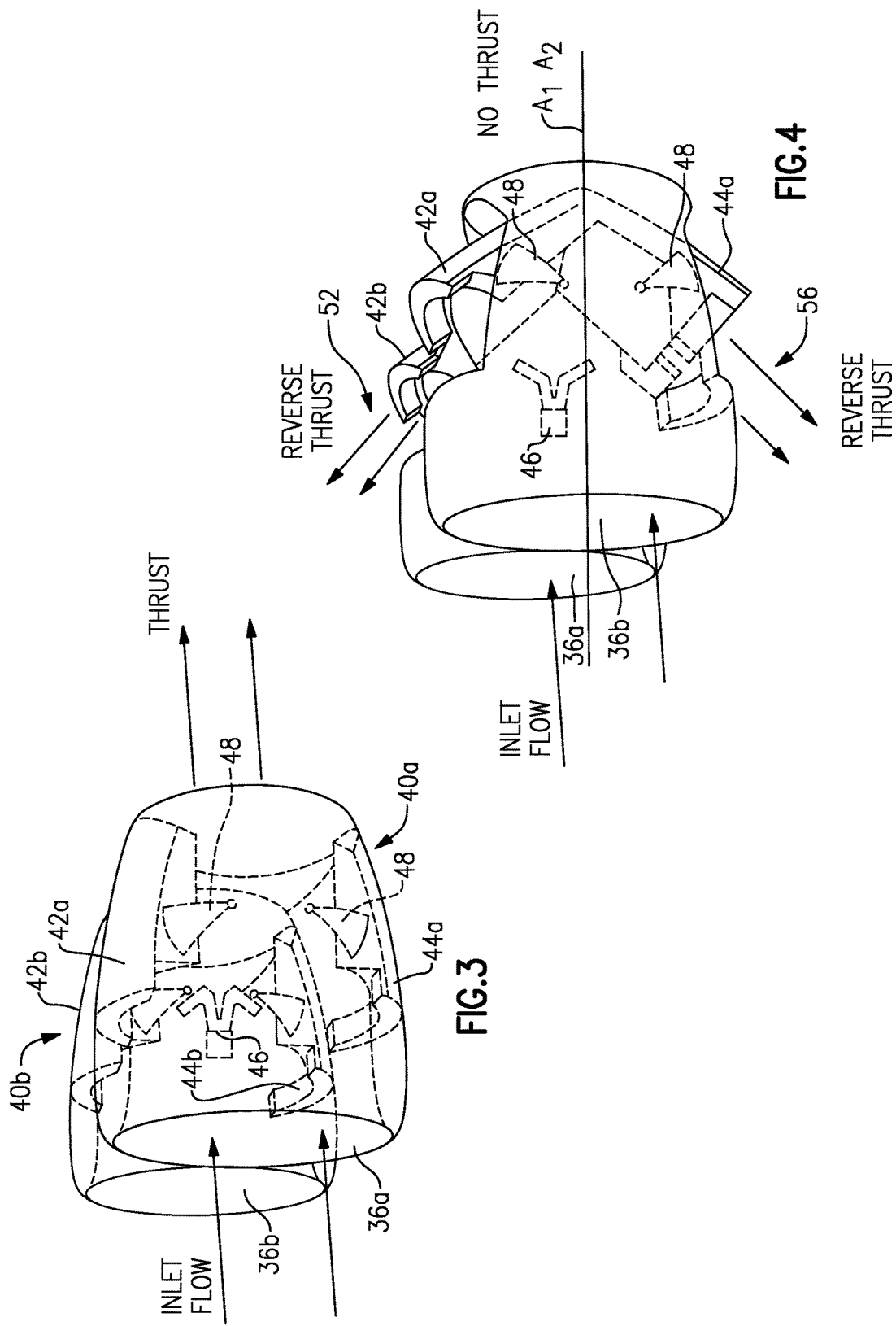

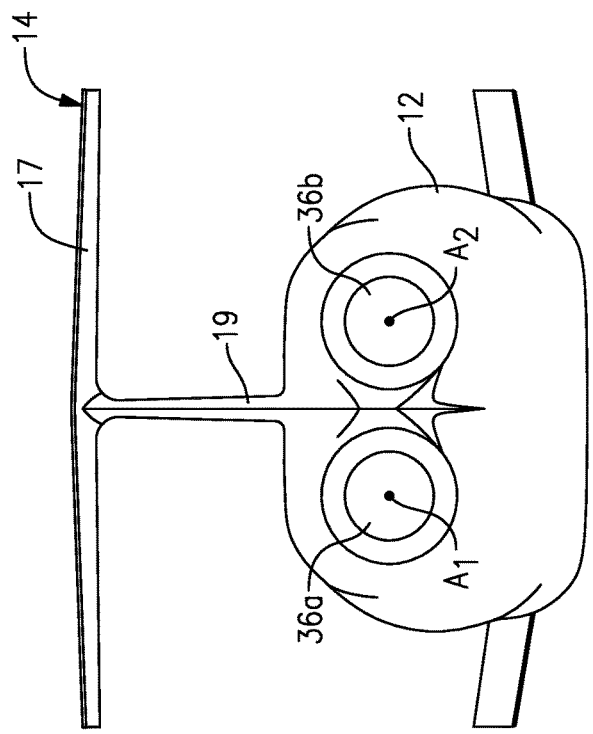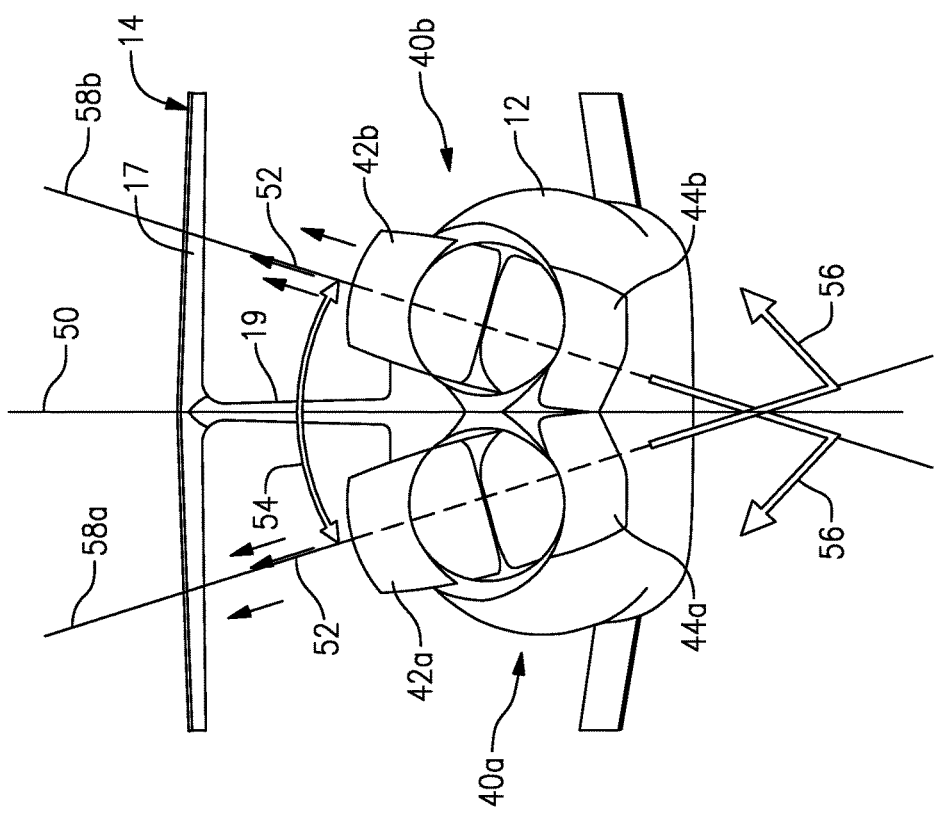

CLOCKED THRUST REVERSERS

CROSS REFERENCE TO RELATED APPLICATION

This application claims priority to U.S. Provisional Application No. 61/725,106 filed on Nov. 12, 2012.

This invention was made with government support under NASA Cooperative Agreement No. NNX11AB35A. The Government has certain rights in this invention.

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

Typically, the gas turbine engine is supported under an aircraft wing on either side of the fuselage. However, such under-wing installations may not be compatible with unique aircraft configurations. Accordingly, different mounting locations for the engines such as at the rear of the fuselage are being considered. Different mountings locations present different challenges and require alternate engine configurations.

A thrust reverser is utilized once an aircraft has landed, and creates a reverse thrust force to aid in slowing the aircraft. Typical thrust reversers and nozzles are components of the engine nacelle surrounding an under-wing mounted engine. Engines mounted within an aircraft fuselage do not include the same nacelle structures and therefore conventional thrust reversing devices may not be compatible.

Alternate aircraft architectures may require alternate mounting locations of the gas turbine engines to enable specific wing and fuselage configurations. However, conventional gas turbine engine configurations have been developed to operate with conventional aircraft architectures.

Accordingly, alternate gas turbine engine configurations may be required and developed to enable implementation of favorable aspects of alternate engine architectures.

SUMMARY

A propulsion system according to an exemplary embodiment of this disclosure, among other possible things includes first and second propulsors mounted at an aft portion of a fuselage, and first and second thrust reversers mounted proximate to corresponding first and second propulsors. Each of the first and second thrust reversers include respective thrust reverser doors, the thrust reverser doors rotatable to a deployed position such that longitudinal centerlines along the thrust reverser doors converge below the thrust reversers thereby reducing lift producible by redirected thrust.

In a further embodiment of the foregoing propulsion system, the thrust reverser doors include an upper door and a lower door pivotally mounted for movement between a stowed position and the deployed position.

In a further embodiment of any of the foregoing propulsion systems, the upper door and the lower door are pivotally mounted for movement along the longitudinal centerline that is angled relative to the vertical plane.

In a further embodiment of any of the foregoing propulsion systems, includes a first engine core driving a first fan and a first bypass passage disposed along a first propulsor axis and a second engine core driving a second fan and a second bypass passage disposed along a second propulsor axis.

In a further embodiment of any of the foregoing propulsion systems, the first and second thrust reversers includes corresponding first and second upper doors and first and second lower doors that are pivotally mounted for movement between a stowed position and the deployed position.

In a further embodiment of any of the foregoing propulsion systems, the first and second upper doors and the first and second lower doors close on a centerline of corresponding ones of the first and second bypass passages to capture both a bypass flow stream and a core flow stream.

An aircraft according to an exemplary embodiment of this disclosure, among other possible things includes a fuselage including an aft portion, a propulsion system supported within the aft portion of the fuselage, and a thrust reverser mounted in the aft portion of the fuselage proximate to the propulsion system for directing thrust in a direction to slow the aircraft. The thrust reverser directs thrust at an angle relative to a vertical plane.

In a further embodiment of the foregoing aircraft, the propulsion system includes a first engine core driving a first fan within a first bypass passage disposed about a first propulsor axis and a second engine core driving a second fan within a second bypass passage disposed about a second propulsor axis and the thrust reverser inlcudes a first and second thrust reversers each directing thrust at an angle relative to the vertical plane.

In a further embodiment of any of the foregoing aircrafts, the first and second thrust reversers are angled away from each other such that airflow directed above the first and second thrust reversers flows away from each other and thrust directed below the first and second thrust reversers combines to reduce excess lift.

In a further embodiment of any of the foregoing aircrafts, the first and second thrust reversers include corresponding first and second upper doors and first and second lower doors that are pivotally mounted for movement between a stowed position and a deployed position.

In a further embodiment of any of the foregoing aircrafts, the first and second doors and the first and second lower doors close on a corresponding one of the first propulsor axis and the second propulsor axis to capture both a bypass flow stream and a core flow stream.

In a further embodiment of any of the foregoing aircrafts, the aircraft includes a vertical stabilizer extending upward from the aft portion of the fuselage and the first and second thrust reversers direct thrust away from the vertical stabilizer.

In a further embodiment of any of the foregoing aircrafts, the vertical stabilizer is disposed between the first and second bypass passages.

In a further embodiment of any of the foregoing aircrafts, the aircraft includes a horizontal stabilizer supported on the vertical stabilizer.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

BRIEF DESCRIPTION OF THE DRAWINGS

FIG. 3 is a schematic view of view of an example thrust reverser in a stowed position.

FIG. 4 is a schematic view of the example thrust reverser in a deployed position.

FIG. 5 is a rear view of the thrust reverser in the deployed position.

FIG. 6 is a rear view of the example thrust reverser in a stowed position.

DETAILED DESCRIPTION

Figure 1:
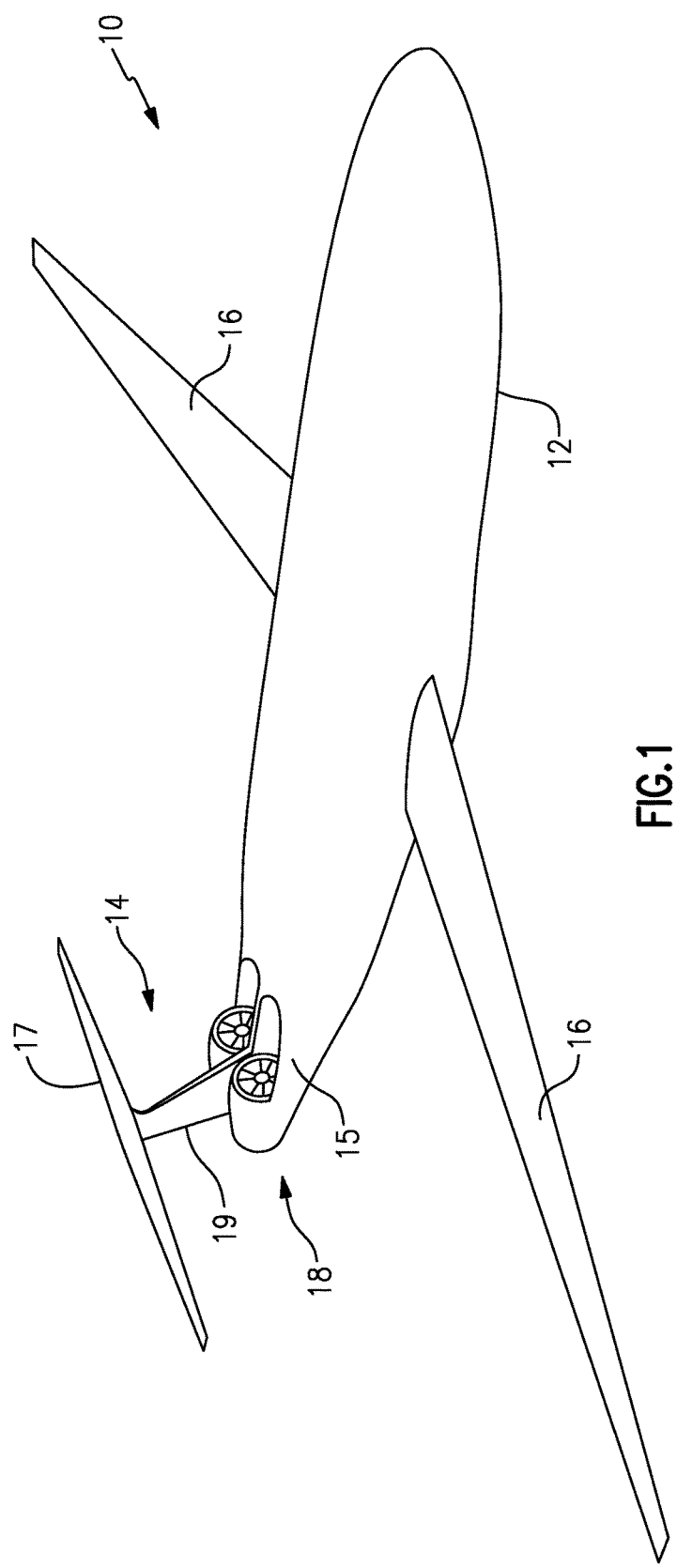
FIG. 1 schematically shows an example aircraft with a propulsion system mounted within a fuselage.
Figure 2:
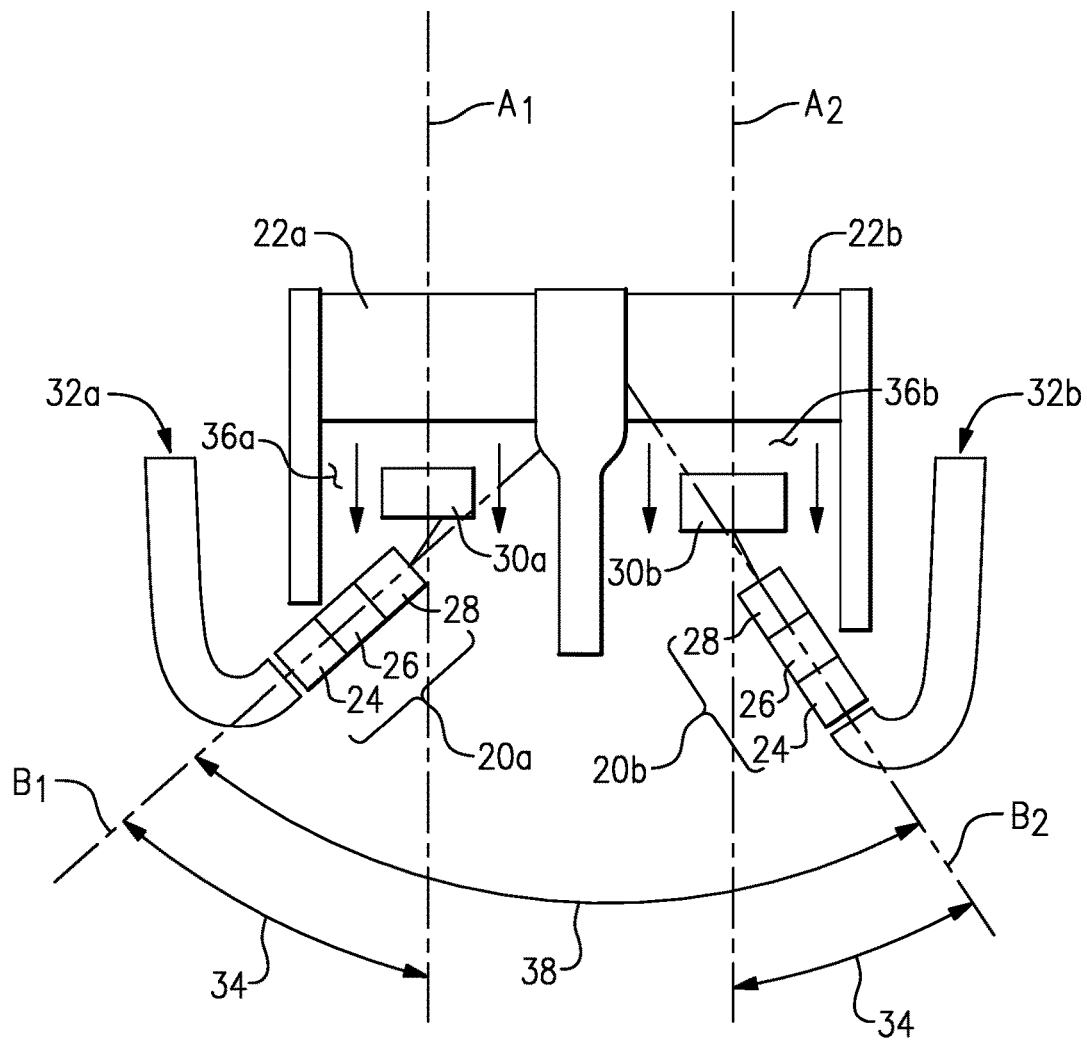
FIG. 2 is a schematic view of an example reverse flow gas turbine engine.

Referring to the FIGS. 1 and 2 an aircraft 10 includes a fuselage 12 having wings 16 and a tail 14. A propulsion system 18 is mounted in aft end 15 of the fuselage 12. The propulsion system 18 includes first and second engine cores, which are reverse core gas turbine engines, 20a-b that drive corresponding first and second propulsors, including fan sections 22a-b. The first and second fan sections 22a-b provide the propulsive thrust through corresponding first and second bypass passages 36a-b.

Each of the fan sections 22a-b are disposed about corresponding first and second propulsor axis A1 and A2. The first and second engine cores 20a-b is disposed about a corresponding first and second engine axis B1 and B2. That is the first engine core 20a is disposed about the first engine axis B1 and drives the first propulsor about the first propulsor axis A1. The second engine core 20b is disposed about the second engine axis B2 and drives the second fan section 20b about the second propulsor axis A2.

The example engine cores 20a-b are gas generators that include a compressor 24, a combustor 26 and a turbine 28. Air is drawn in through inlets 32a-b to the compressor 24 is compressed and communicated to a combustor 26. In the combustor 26, air is mixed with fuel and ignited to generate an exhaust gas stream that expands through the turbine 28 where energy is extracted and utilized to drive the compressor 24 and corresponding fan 22a-b. In this example the engine cores 20a-b drive the corresponding fan 22a-b through a geared architecture 30a-b that is part of the propulsor.

In the disclosed example, each of the first and second propulsors 22a-b is mounted substantially parallel to each other about respective propulsor axes A1, A2. The first and second engine axes B1, B2 are disposed at an angle 34 relative to the corresponding propulsor axis A1, A2. The engine cores 20a-b are also angled away from each other at an angle 38.

Referring to FIGS. 3 and 4, the aircraft includes a thrust reverser for directing thrust to slow the aircraft 10 upon landing. The disclosed thrust reverser includes a first thrust reverser 40a and a second thrust reverser 40b for corresponding bypass passages 36a-b. The first and second thrust reversers 40a-b include corresponding first and second upper doors 42a, 42b and first and second lower doors 44a, 44b.

The upper and lower doors 42a-b, 44a-b are movable between a stowed position (FIG. 3) and a deployed position (FIG. 4). Movement of the upper and lower doors 42a-b, 44a-b, is facilitated by pivots 48 that support rotation between stowed and deployed positions. An actuator 46 is provided to move the upper and lower doors 42a-b, 44a-b between the stowed and deployed positions.

In the stowed position, thrust flows unimpeded through the bypass passages 36a-b. In the deployed position, thrust is directed upwardly as indicated at 52 and downwardly as indicated at 56 about the propulsor axes A1, A2. The upward and downward directed thrust 52, 54 slows the aircraft 10 during landing. In some aircraft 10 architectures, the downward directed thrust 54 can generate undesired lift by directing thrust under the aircraft fuselage 12 or other surface. As appreciated, thrust that generates lift, or interferes with desired aircraft aerodynamic performance is undesirable.

Referring to FIGS. 5 and 6, the example thrust reversers 40a-b are angled relative to a vertical plane 50 to reduce and/or eliminate the generation of lift on the aircraft 10. The first and second thrust reversers 40a-b are circumferentially oriented, or clocked about the corresponding propulsor axes A1, A2 to direct upward thrust 52 away from the vertical plane 50.

In this example the first and second thrust reversers 40a-b close about respective centerlines 58a, 58b that are angled away from each other above the axes A1, A2. The angle 54 between the centerlines 58a, 58b enables direction of upward thrust 52 away from the vertical plane 50 and vertical stabilizer 19.

The angle 54 results in the centerlines 58a-b intersecting at a point below the axes A1, A2. Accordingly, downward thrust 56 combine below the axes A1, A2 and the aircraft fuselage 12 to effectively cancel any resulting lift forces generated on the fuselage 12.

Accordingly, the disclosed thrust reversers 40a-b are angled to avoid thrust impingement on the tail 14 and also combine downward thrust to substantially reduce any generation of lift on the aircraft.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. An aircraft propulsion system comprising:
   first and second propulsors mounted at an aft portion of a fuselage, wherein the first propulsor comprises a first engine core disposed along a first engine axis and driving a first fan and a first bypass passage disposed along a first propulsor axis and the second propulsor comprises a second engine core disposed along a second engine axis and driving a second fan and a second bypass passage disposed along a second propulsor axis, wherein the first engine axis and the second engine axis are disposed at an angle relative to a corresponding one of the first propulsor axis and the second propulsor axis; and
   first and second thrust reversers mounted proximate to corresponding first and second propulsors, wherein each of the first and second thrust reversers include respective thrust reverser doors, the thrust reverser doors rotatable to a deployed position such that longitudinal centerlines along the thrust reverser doors converge below the thrust reversers thereby reducing lift producible by redirected thrust.

2. The aircraft propulsion system as recited in claim 1, wherein each of the first thrust reverser and the second thrust reverser doors comprises an upper door and a lower door pivotally mounted for movement between a stowed position and the deployed position.

3. The aircraft propulsion system as recited in claim 2, wherein the upper door and the lower door are pivotally mounted for movement along the longitudinal centerline that is angled relative to the vertical plane.

4. The aircraft propulsion system as recited in claim 1, wherein the first and second thrust reversers comprises corresponding first and second upper doors and first and second lower doors that are pivotally mounted for movement between a stowed position and the deployed position.

5. The aircraft propulsion system as recited in claim 4, wherein the first and second upper doors and the first and second lower doors close on a centerline of corresponding ones of the first and second bypass passages to capture both a bypass flow stream and a core flow stream.

6. An aircraft comprising;
a fuselage including an aft portion;
a propulsion system supported within the aft portion of the fuselage, the propulsion system comprises a first engine core disposed along a first engine axis and driving a first fan within a first bypass passage disposed about a first propulsor axis and
a second engine core disposed along a second engine axis and driving a second fan within a second bypass passage disposed about a second propulsor axis, wherein the first engine axis and the second engine axis are disposed at an angle relative to a corresponding one of the first propulsor axis and the second propulsor axis;
a first thrust reverser mounted in the aft portion of the fuselage proximate to the fan and first bypass passage for directing thrust in a direction to slow the aircraft;
a second thrust reverser mounted in the aft portion of the fuselage proximate to the second fan and second bypass passage for directing thrust in a direction to slow the aircraft wherein each of the first thrust reverser and the second thrust reverser directs thrust at an angle relative to a vertical plane.

7. The aircraft as recited in claim 6, wherein the first and second thrust reversers are angled away from each other such that airflow directed above the first and second thrust reversers flows away from each other and thrust directed below the first and second thrust reversers combines to reduce excess lift.

8. The aircraft as recited in claim 6, wherein the first and second thrust reversers comprise corresponding first and second upper doors and first and second lower doors that are pivotally mounted for movement between a stowed position and a deployed position.

9. The aircraft as recited in claim 8, wherein the first and second doors and the first and second lower doors close on a corresponding one of the first propulsor axis and the second propulsor axis to capture both a bypass flow stream and a core flow stream.

10. The aircraft as recited in claim 7, wherein the aircraft includes a vertical stabilizer extending upward from the aft portion of the fuselage and the first and second thrust reversers direct thrust away from the vertical stabilizer.

11. The aircraft as recited in claim 10, wherein the vertical stabilizer is disposed between the first and second bypass passages.

12. The aircraft as recited in claim 10, wherein the aircraft includes a horizontal stabilizer supported on the vertical stabilizer.

* * * * *

UNITED STATES PATENT AND TRADEMARK OFFICE
CERTIFICATE OF CORRECTION

PATENT NO. : 9,663,239 B2  
APPLICATION NO. : 14/440718  
DATED : May 30, 2017  
INVENTOR(S) : Gabriel L. Suciu and Jesse M. Chandler Page 1 of 1

It is certified that error appears in the above-identified patent and that said Letters Patent is hereby corrected as shown below:

In the Claims

Claim 3, Column 5, Line 4; after "angled relative to" replace "the vertical plane." with --a vertical plane.--

Claim 9, Column 6, Line 17; before "and the first and second lower doors" replace "second doors" with --second upper doors--

Signed and Sealed this  
Twenty-fourth Day of July, 2018

Andrei Iancu  
*Director of the United States Patent and Trademark Office*